June 23, 1953  A. J. PALKO ET AL  2,642,914

TIRE

Filed Sept. 28, 1951

*INVENTOR.*
ANDREW J. PALKO
BY WALTER E. SHIVELY

R. L. Miller
ATTORNEY

UNITED STATES PATENT OFFICE 2,642,914

TIRE

Andrew J. Palko and Walter E. Shively, Akron, Ohio, assignors to Wingfoot Corporation, Akron, Ohio, a corporation of Delaware Application September 28, 1951, Serial No. 248,822

7 Claims. (Cl. 152—209)

The present invention relates to a novel form of pneumatic, semi-pneumatic, or solid rubber tire. More particularly the invention pertains to a tread pattern for use on the tread portion of a tire to provide improved traction especially when snow and ice are prevalent on the highway or terrain to be traversed by the vehicle.

It is the principal object of the invention to impart to a tire improved traction and non-skid properties in the tread portion thereof without sacrificing good wearing qualities.

It is a further object of the invention to provide a tire tread pattern which, while it possesses improved non-skid properties, will also have the desired lateral stability to resist side slipping.

Other important objects and advantages of the invention will become apparent from the following description of a tire embodying the teachings of the invention and illustrated in the accompanying drawings.

Figure 1:
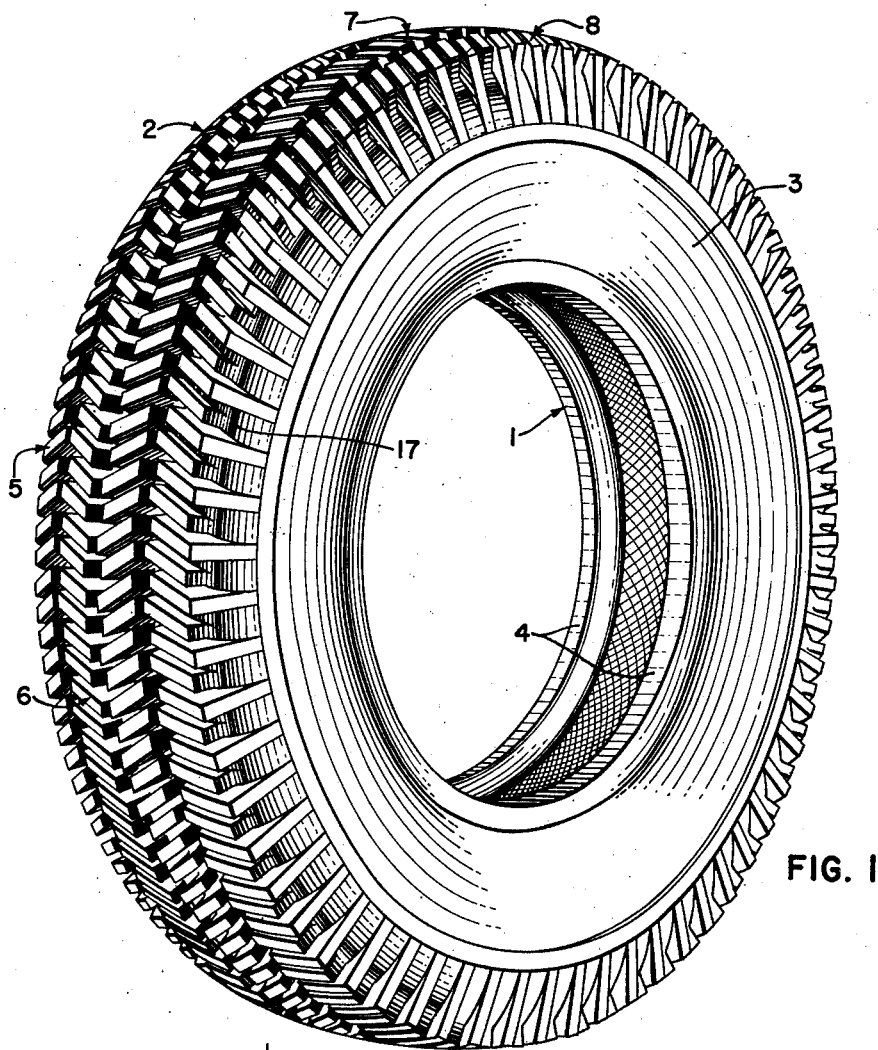
Figure 2:
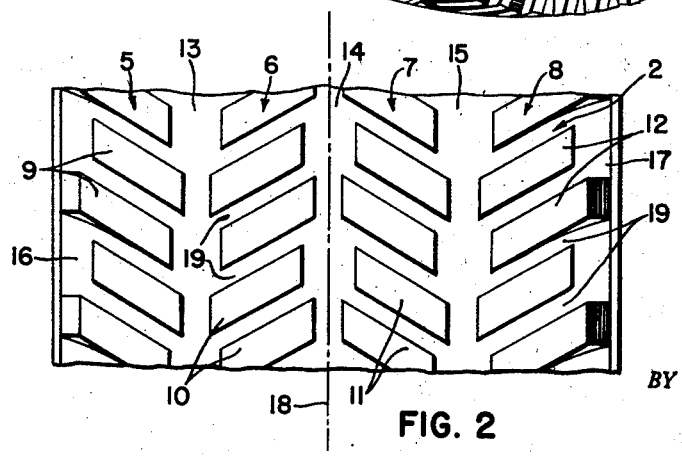

In the drawings, Fig. 1 is a perspective view of a pneumatic tire having a tread portion embodying the teachings of the present invention. Fig. 2 is a large-scale plan view showing the flat development or imprint of a part of the tread portion of the tire of Fig. 1.

The reference numeral 1 refers generally to the pneumatic tire illustrated in Fig. 1 of the drawings. The tire 1 is of conventional construction having a tread portion 2 and sidewall portions 3 at the innermost extremities of which are the inextensible beads 4.

As will be noted from Figs. 1 and 2 of the drawings, the tread portion 2 of the tire 1 is characterized by a series of circumferentially extending raised portions or ribs 5, 6, 7, and 8. The ribs 5, 6, 7, and 8 are formed of the cooperating individual embossed portions or lugs 9, 10, 11, and 12 and are defined by the circumferentially extending grooves 13, 14, and 15 as well as the marginal extremities or shoulders 16 and 17 where the tread portion 2 joins the sidewalls 3. The centrally disposed groove 14 is said to be that located on the great circle of the tire 1 indicated by the broken line 18 in Fig. 2 which represents the greatest outer circumferential dimension of the torus.

The several lugs 9 in the rib 5, for example, are arranged in mutually parallel relation to each other and are formed by the cooperation between the molded diagonally disposed slots 19, the groove 13, and the shoulder 16. The lugs 10, 11, and 12 of the several ribs 6, 7, and 8, respectively, are similarly formed by the molded slots 19 intersecting the grooves 14 and 15 or the shoulder 17 as the case may be. These slots 19 are mutually parallel and intersect the grooves 13, 14, and 15 at an angle and thus are inclined with respect thereto. This disposition of the slots 19 and the grooves 13, 14, and 15 gives the individual lugs 9, 10, 11, and 12 an exposed surface pattern of identical regular parallelograms.

By virtue of the arrangement of the lugs 9 and 10 in the tread portion 2 of the tire 1, any two adjacent ribs 5 and 6 will bear to each other a substantially chevronlike relationship. This same chevronlike relationship is found in the case of the opposed pairs 10 and 11 of the rib 6 and 7, respectively, as well as the opposed pairs 11 and 12 of the ribs 7 and 8, respectively. The chevronlike arrangement of the opposed pairs of lugs 10 and 11 in the respective ribs 6 and 7 is reversed with respect to the relationship of the opposed pairs of lugs 9, 10 and 11, 12.

This relationship or arrangement of the several lugs 9, 10, 11, and 12 of the ribs 5, 6, 7, and 8, respectively, is also referred to as being of a modified herringbone pattern. This herringbone pattern is modified in that, as will be apparent from Fig. 2, certain of the opposed pairs of lugs 10 and 11 in the ribs 6 and 7, respectively, for example, on opposite sides of the great circle 18, are offset inwardly and thus more closely spaced than the corresponding pairs of lugs above or below.

This variation in the spacing between certain adjacent lugs 10 and 11 occurs alternately in the tread portion 2 of the tire 1 although it will be understood that any other suitable pattern development contemplating a similar relationship of the lugs in a recurring sequence circumferentially of the tire would operate in like manner. Thus, instead of the alternate opposed pairs of lugs 10 and 11 being disposed in narrowly spaced relation, a modified pattern in which certain of the opposed pairs of lugs will be disposed in closer relationship than the remaining pairs in a recurring sequence may be employed. In other words, two or more opposed pairs in a circumferential direction around the tread portion 2 of the tire 1 may be widely spaced succeeding two closely spaced lugs. Moreover, this arrangement may be of diminishing relation, varying from a narrow spacing to a wide spacing just as long as the arrangement will recur in repetitive sequence throughout the tread portion 2 of the tire 1.

It will also be noted in Fig. 2 that where opposed pairs of lugs 10 and 11 in the ribs 6 and 7, respectively on opposite sides of the great circle 18 of the tire 1 are closely spaced by reason of the aforementioned offsetting, the same lugs will be widely spaced with respect to their corresponding opposed lugs 9 and 12 in the ribs 5 and 8, respectively. By the same token, the remaining lugs 10 and 11 in the ribs 6 and 7, respectively, which are more widely spaced, will be closely spaced with respect to their corresponding opposed lugs 9 and 12 in the ribs 5 and 8, respectively, in the grooves 13 and 15. As a result of the above-described relationship, it will be understood that the annular grooves 13, 14, and 15 will vary in width throughout their circumferential dimension.

This offset relationship between the several lugs 9, 10, 11, and 12 and the uniform variation in width of the several grooves 13, 14, and 15 in the circumferential direction affords certain distinct advantages to the effective operation of the tire 1. The ends of the several lugs 10 and 11, for example, project into the centrally disposed groove 14 and present effective gripping edges to the snow and ice-covered terrain as the tire 1 rolls over it. The same result is accomplished with the projecting ends of the closely spaced opposed pairs of lugs 9, 10, and 11, 12 extending into the grooves 13 and 15, respectively.

These features of the tread portion of the tire 1 of Figs. 1 and 2 supplement the advantages gained from the use of the herringbone relation of the multiplicity of small flexible lugs 9, 10, 11, and 12 in the ribs 5, 6, 7, and 8, respectively. The tire 1 moreover carries out the same alternate offsetting of the outermost extremities 9 and 12 adjacent the shoulders 16 and 17, respectively, thereby producing a cogged or cleated effect adjacent the sidewalls 3 of the tire. All of these features cooperate with the circumferentially extending grooves to insure for the tire 1 maximum traction and good lateral stability against side slipping.

It is important in the design of the tire that the optimum degree of inclination of the lugs 9, 10, 11, 12 be carefully predetermined to insure maximum traction, minimum wear, and some degree of self-cleaning ability. Experience has clearly demonstrated that a tire tread portion having a large number of lugs extending transversely across or normal to the great circle of the tire will give good traction, but has poor wearing qualities. Similarly, a tire tread portion in which the lugs are disposed at a rather small degree of angularity approaching a parallel relation to the great circle of the tire will possess excellent wearing qualities, but will give poor traction in snow and ice.

Thus, the primary purpose of the present invention is achieved in the tread portions of tire 1, by incorporating therein numerous laterally offset circumferentially flexible elements or lugs arranged at a predetermined angle of approximately 50 to 75 degrees from the great circle of the tire. The circumferential flexibility of the lugs 9, 10, 11, 12 of the tire 1 is obtained by establishing the proper predetermined proportion of the width of the lug to its vertical dimension. Obviously, this ratio will change as the tire wears, but it is desirable to select a width $w$ and vertical dimension $h$ such that the quotient of $w/h$ will closely approximate 1 throughout the major portion of the effective operating life of the tire.

The optimum results are obtained with a tire tread portion in which the lugs are disposed at an angle of approximately 60 degrees with respect to the great circle of the tire. Moreover, when the tire is new, the width $w$ of the lug should be about three-eighths to one-half inch with a vertical dimension $h$ of approximately nine-sixteenths inch. As the tire wears $h$ will gradually be reduced to approximate the original $w$ dimension and the ratio $w/h$ will vary from about 0.75 to about 1.5. When the latter condition is reached, the circumferential flexibility of the lugs and their effectiveness will be materially reduced. It is to be noted from the drawings that the circumferential spacing of the lugs is materially less than the width of the lugs in a circumferential direction but the lugs are spaced a substantial amount from each other in order to permit flexing of the lugs for maximum efficiency thereof.

While one representative embodiment has been shown for the purpose of illustrating the invention, it will be apparent to those skilled in this art that various changes and modifications may be made therein without departing from the spirit or scope of the invention.

We claim:

1. A tire having a tread portion comprising a multiplicity of individual elongated lugs having substantially identically shaped tread surfaces of quadrilateral shape and having a length substantially at least twice the width thereof, and being spaced from each other circumferentially and transversely of the tread, the arrangement of the lugs transversely of the tread being in a substantially herring-bone pattern with three circumferential grooves spacing the lugs into four circumferentially extending ribs, each of which embodies a multiplicity of substantially parallel lugs in inclined relation to an adjacent groove, corresponding opposed ends of certain pairs of lugs in adjacent ribs on opposite sides of the groove on the great circle of the tire being offset in more closely spaced relation to each other than similar opposed ends of other pairs of lugs adjacent to the said first pairs, and the opposed ends of certain pairs of lugs in adjacent ribs on opposite sides of the other grooves being offset transversely similarly to the opposed ends of the pairs of lugs on opposite sides of the groove on the great circle of the tire, each of the lugs being of substantial height and appreciably spaced from each other a distance sufficient to permit normal flexing of the lugs under the driving and braking stresses without normally contacting but less than the width of the lugs.

2. A tire having a tread portion comprising a multiplicity of individual lugs having exposed tread surfaces of elongated quadrilateral shape arranged in a substantially herringbone pattern, and three circumferentially extending grooves, including one disposed on the great circle of the tire, for separating the several lugs into four circumferentially extending ribs each of which embodies a plurality of closely spaced substantially parallel lugs disposed with their longest dimension in inclined relation to the several grooves, corresponding opposed lugs in the two inner ribs on opposite sides of the groove on the great circle of the tire being arranged in pairs, the inner ends of the lugs of certain of said pairs adjacent the great circle of the tire being located in more closely spaced relation to each other than the inner ends of the lugs of other of said pairs in the same ribs and also being located in more closely spaced relation to each other than are the outer ends of the same lugs and the inner ends of the corresponding lugs in the two outermost ribs, each of the lugs being of substantial height and appreciably spaced from each other a distance sufficient to permit normal flexing of the lugs under the driving and braking stresses without normally contacting but less than the width of the lugs.

3. A tire having a tread portion comprising a multiplicity of individual lugs having exposed tread surfaces of elongated quadrilateral shape arranged in a substantially herringbone pattern, and three circumferentially extending grooves, including one disposed on the great circle of the tire, for separating the several lugs into four circumferentially extending ribs each of which embodies a plurality of substantially parallel lugs disposed with their longest dimension in inclined relation to the several grooves, corresponding opposed lugs in the two inner ribs on opposite sides of the groove on the great circle of the tire being arranged in pairs, the inner ends of the lugs of certain of said pairs adjacent the great circle of the tire being located in more closely spaced relation to each other than the inner ends of the lugs of other of said pairs in the same ribs and also being located in more closely spaced relation to each other than are the outer ends of the same lugs and the inner ends of the corresponding lugs in the two outermost ribs, and the inner ends of the lugs of said other pairs being located in more widely spaced relation to each other adjacent the great circle of the tire than the outer ends of the said other lugs and the inner ends of the corresponding lugs in the two outermost ribs, each of the lugs being of substantial height and appreciably spaced from each other a distance sufficient to permit normal flexing of the lugs under the driving and braking stresses without normally contacting but less than the width of the lugs.

4. A tire having a tread portion comprising a multiplicity of individual lugs having exposed tread surfaces of elongated quadrilateral shape and being arranged in a substantially herringbone pattern, and three circumferentially extending grooves, including one disposed on the great circle of the tire, for separating the several lugs into four circumferentially extending ribs each of which embodies a plurality of substantially parallel lugs disposed with their longest dimension in inclined relation to the several grooves, corresponding opposed lugs in the two inner ribs on opposite sides of the groove on the great circle of the tire being arranged in pairs, the inner ends of the lugs of certain of said pairs adjacent the great circle of the tire being located in more closely spaced relation to each other than the inner ends of the lugs of other of said pairs in the same ribs and also being located in more closely spaced relation to each other than are the outer ends of the same lugs and the inner ends of the corresponding lugs in the two outermost ribs, the outer ends of certain of said lugs in the two outermost ribs projecting a greater distance toward the outer edge of the tread than do other of said lugs in the same ribs, each of the lugs being of substantial height and appreciably spaced from each other a distance sufficient to permit normal flexing of the lugs under the driving and braking stresses without normally contacting but less than the width of the lugs.

5. A tire comprising a tread portion formed of a multiplicity of relatively narrow elongated lugs of substantially greater length than with having their long dimension in the tread at a substantial inclination to the circumferential center line of the tread and also to a line which is parallel to the tire axis, the lugs being arranged in at least three circumferentially extending spaced rows, thus forming continuous circumferentially extending grooves therebetween, the inclination of the lugs in some of said rows being in an opposite sense to the inclination of lugs in other rows, the corresponding ends of substantial numbers of adjacent lugs in each row being offset transversely with respect to each other, each of the lugs being of substantial height and appreciably spaced from each other by inclined grooves a distance sufficient to permit normal flexing of the lugs under the driving and braking stresses without normally contacting, but less than the width of the lugs.

6. A tire comprising a tread portion formed of a multiplicity of relatively narrow elongated lugs of substantially greater length than width having their long dimension in the tread surface at a substantial inclination to the circumferential center line of the tread and also to a line which is parallel to the tire axis, the lugs being arranged in at least three circumferentially extending spaced rows, thus forming continuous circumferentially extending grooves therebetween, the inclination of the lugs in some of said rows being in an opposite sense to the inclination of lugs in other rows, the corresponding ends of substantial numbers of adjacent lugs in each row being offset transversely with respect to each other, the lugs in adjacent rows being opposed and the ends of some of the opposed lugs of adjacent rows being in more closely spaced relation than the corresponding ends of other opposed lugs in the same adjacent rows, each of the lugs being of substantial height and appreciably spaced from each other by inclined grooves a distance sufficient to permit normal flexing of the lugs under the driving and braking stresses without normally contacting, but less than the width of the lugs.

7. A tire comprising a tread portion having at least two circumferentially extending laterally spaced rows of elongated lugs, thus forming between said rows a continuous circumferentially extending groove, the ground engaging surfaces of the lugs being in the form of regular parallelograms with the long sides substantially parallel to each other and at an inclination to said groove of between 50° and 75° and the short sides being substantially parallel to said groove, the lugs having a width of the order of ½" and a height approximately of the same order, the lugs in each row being sufficiently spaced from each other to permit substantial flexing of the lugs permitted by the relative narrow width thereof without engagement with each other under normal conditions but being spaced less than the width of the lugs, and a substantial number of said lugs in each row being offset laterally with respect to adjacent lugs in the same row, the lugs in adjacent rows being inclined away from said groove in the same circumferential direction.

ANDREW J. PALKO.
WALTER E. SHIVELY.

References Cited in the file of this patent

UNITED STATES PATENTS

| Number | Name | Date |
|---|---|---|
| D. 79,271 | Tyler | Aug. 20, 1929 |
| D. 92,418 | Miller | June 5, 1934 |
| D. 102,275 | Hubener | Dec. 8, 1936 |
| 2,104,532 | Sommer | Jan. 4, 1938 |

FOREIGN PATENTS

| Number | Country | Date |
|---|---|---|
| 21,098 | Great Britain | 1897 |
| 136,076 | Austria | Dec. 27, 1933 |